United States Patent [19]
Wakuta et al.

[11] Patent Number: 5,156,579
[45] Date of Patent: Oct. 20, 1992

[54] LUBRICATING DEVICE FOR A VEHICLE MOTOR

[75] Inventors: Satoru Wakuta, Anjo; Mutsumi Kawamoto, Tokyo, both of Japan

[73] Assignee: Aisin Aw Co., Ltd., Japan

[21] Appl. No.: 716,620

[22] Filed: Jun. 19, 1991

[30] Foreign Application Priority Data

Nov. 20, 1990 [JP] Japan .................. 2-314906

[51] Int. Cl.⁵ .................. G16H 1/32; G16H 57/04
[52] U.S. Cl. .................. 475/161; 180/65.5; 180/65.6; 310/54; 310/64; 310/83; 475/149; 475/159
[58] Field of Search .................. 475/149, 159, 161; 180/65.5, 65.6, 242; 310/54, 64, 83

[56] References Cited

U.S. PATENT DOCUMENTS

| | | | |
|---|---|---|---|
| 4,799,564 | 1/1989 | Iijima | 180/65.5 |
| 5,014,800 | 5/1991 | Kawamoto et al. | 180/65.5 |

Primary Examiner—Allan D. Herrmann
Attorney, Agent, or Firm—Lorusso & Loud

[57] ABSTRACT

A wheel motor is provided with a stator which includes a coil wound therearound and which is fixed to a casing, a hollow cylindrical rotor which is supported by the casing through a bearing and is disposed inside the stator, an output flange which is supported by the casing through a bearing and which is fixed to a wheel, a reduction mechanism which includes an input gear supported by the rotor and an output gear supported by the output flange and which is disposed in the hollow in the rotor, an oil pump motor disposed in a lower portion of the casing, an oil passage extending upward through a side wall of the casing, and an oil passage which is formed in an upper portion of the casing and which feeds a discharge port through which oil is ejected for cooling the stator coil. The lubricating system for the wheel motor includes a lubricating oil passage extending from the oil passage in the upper portion of the casing to the reduction mechanism for supplying the cooled oil to the reduction mechanism.

10 Claims, 3 Drawing Sheets

LUBRICATING DEVICE FOR A VEHICLE MOTOR

BACKGROUND OF THE INVENTION

1. Field of the Invention

The present invention relates to a lubricating device for an electric motor for use in an electric automobile.

2. Description of the Prior Art

In recent years, in view of environmental problems, electric automobiles have been extensively developed. One known type uses wheel motors with each motor being directly connected to a wheel through a reduction gear or mechanism.

In an arrangement wherein each wheel is directly connected to a motor through the reduction gear, it is necessary to prevent the vehicle body from interfering with the motor and the reduction gear during vertical movements and steering operations of the wheels. This requirement places a restriction on installation space. Therefore, reduction of the size of the motor and of the reduction gear is necessary to mount them in a limited space. Further, electric automobiles require motors which have a small and light structure as well as a large output torque so as to provide high power relative to the vehicle weight.

However, in order to reduce the size and weight of the motor and to increase the output torque thereof, it is necessary to pass a large current through the coil of the motor, so that the coil generates a large amount of heat, which heat may cause burning of the coil. Therefore, it is important to suppress the heating of the coil in the overloaded state, by cooling it in order to obtain the intended performance of the motor.

FIG. 3 illustrates an example of a cooling device for the wheel motor which has been proposed by the applicant.

A casing assembly or main part 81 fixedly supports a stator 83 around which a coil is wound. In the casing assembly 81, a rotor 82 is supported by bearings, and a reduction gear or mechanism 96 is arranged to transmit rotation of the rotor to an output shaft 97. The rotation of the rotor is detected by a resolver 95. An oil pump 86 is disposed at a lower portion of the casing assembly, and a plate 87 and a cover 88 provided with fins are formed on a side wall of the casing to form an oil passage 89 which has an inlet port 90 at its lower end and an outlet port 91 at its upper end. The outlet port 91 is in communication with an oil passage 92 located at an upper end of the casing. The oil passage 92 has a discharge port 93.

Cooling oil is supplied by the oil pump 86 from an oil sump 85 through the inlet port 90 into the oil passage 89 and is cooled while it flows upward in the oil passage 89. The cooled oil is introduced through the outlet port 91 into the oil passage 92, and is ejected through the discharge port 93 directly onto the stator coil 84 to cool it. The oil which has received heat from the coil returns to the oil sump along an oil guide 94, flowing over a coil end.

Lubrication of the reduction gear and other elements is effected by oil which overflows directly onto them from the oil guide, or by the oil which is thrown from the peripheral surfaces of the rotating rotors, in other words, by centrifugal force.

However, the oil is required to perform several functions, i.e. the cooling function for removing heat from the coil, the function of reducing friction at friction surfaces of the reduction mechanism, and the function of removing the frictional heat. Therefore, oil having a low viscosity has been used to increase the cooling effect on the coil and the reduction mechanism. However, such oil may not form a stable oil film when it is heated by the hot coil, so that the effectiveness for reducing the friction of the reduction gear is decreased and the durability of the reduction gear and moving components is adversely affected.

It is an object of the invention to provide a lubricating device for a wheel motor, overcoming the above-noted problems, in which both the cooling and the lubricating of the wheel motor can be effectively performed.

SUMMARY OF THE INVENTION

The present invention provides structures in which oil is supplied from an oil pump motor at a lower portion of a casing along a side wall of the casing to an upper oil passage in the casing for cooling the oil. The thus cooled oil is then discharged from the upper oil passage in the casing onto a stator coil to cool it, then is directly introduced into a rotating shaft of a reduction gear at a lower part through a lubricating oil passage connected to the reduction gear, and then injected by centrifugal force onto the bearings and tooth surfaces of the reduction gear, i.e. onto frictional surfaces. If a wheel motor has a compact structure in which a bearing is disposed between the rotor part and a ring gear, the oil which is injected for cooling the coil and also for cooling the reduction gear, as is done in the prior art, cannot sufficiently lubricate the bearings and the tooth surfaces of the reduction gear, because the oil is splashed due to the rotation of the rotor and the bearings. In contrast, the present invention can employ a compact structure, in which cooled oil having a high viscosity is supplied through the oil passages directly to the reduction gear and ejected by centrifugal force onto various portions of the reduction gear, so that the bearings and the tooth surfaces of the reduction gear can be sufficiently lubricated and cooled, and thus the durability of the reduction gear and other elements can be increased.

Although the conventional oil pump is intended to discharge at a rate in proportion to rotational speed, proportional discharge cannot be achieved because of viscosity changes in accordance with oil temperature. Thus, at an initial stage of driving, the oil pump cannot supply sufficient oil due to its higher viscosity, so that the wheel motor runs with less lubricating oil, which may cause problems such as seizure. However, the present invention is designed to detect and monitor control parameters such as rotational speed and output torque of the motors as well as the temperature of the oil, coil, casing and ambient air for controlling the oil pump motor, so that an adequate amount of oil can always be supplied for efficient lubrication.

These and other objects and features of the invention will become more apparent from the following description of preferred embodiments with reference to the accompanying drawings.

DETAILED DESCRIPTION OF THE PREFERRED EMBODIMENTS

Figure 1:
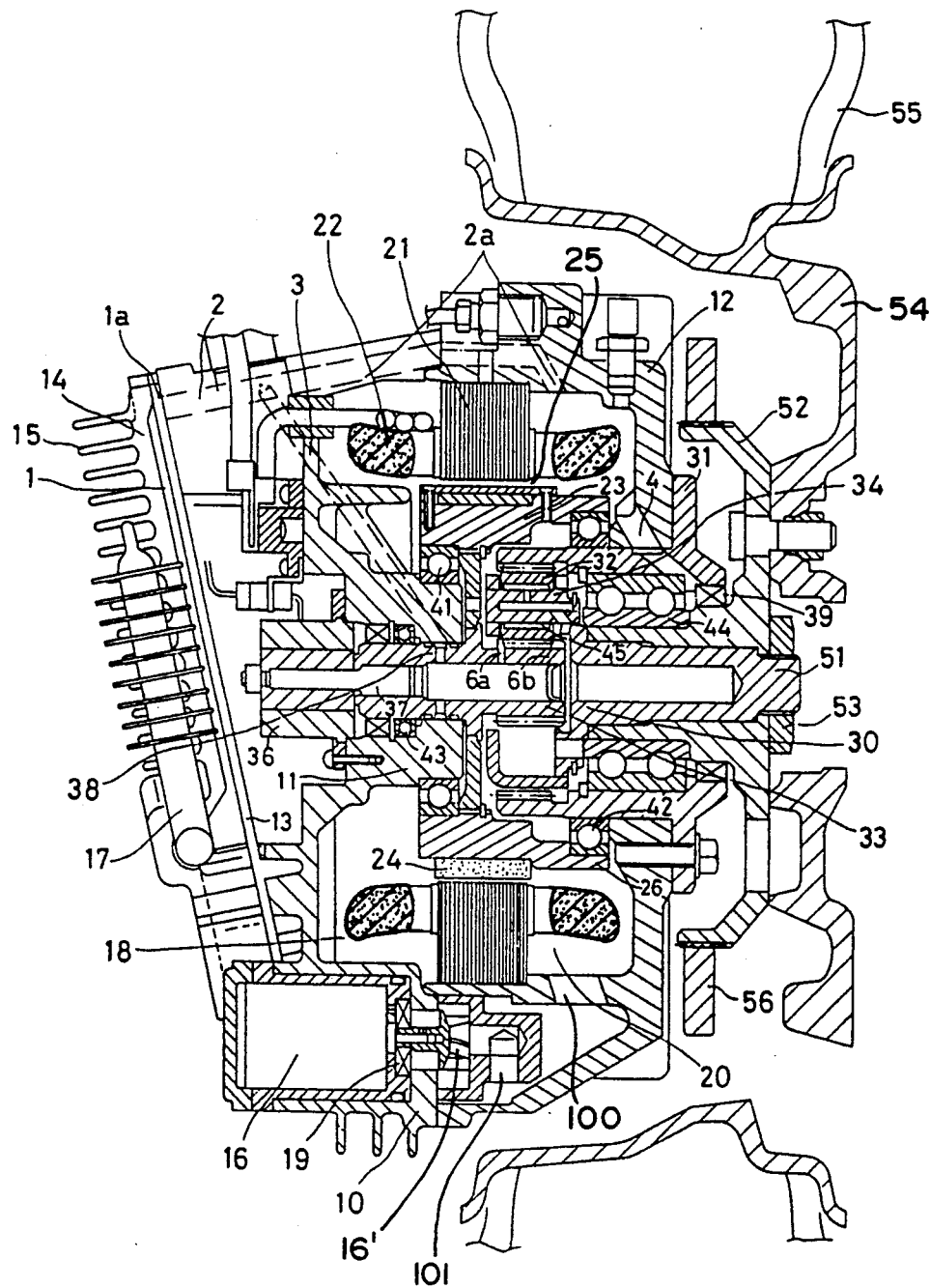
FIG. 1 is a cross-section of a lubricating device for a wheel motor of the invention.

Referring to FIG. 1, a casing assembly or main body 10 has a two-piece structure formed of a cylindrical support side housing 11 and a wheel side housing 12, which are held together by bolts (not shown). A plate 13 and a cover 14 are held to the side of the support side housing 11 opposite the wheel side housing 12 by bolts (not shown). The support side housing 11 is held to a support (not shown) by bolts. An oil pump motor 16 is disposed in a bottom portion of the housing 11. The plate 13 and the cover 14 form an oil passage 1 therebetween, in which oil flow from an oil sump 18 at the bottom is cooled. The oil pump motor 16 is provided at its inlet side with an oil seal 19. The inlet side of the oil pump 16' receives oil from oil sump 18 through passages 100 and 101. The cover 14 is provided at its outer surface with a large number of cooling fins 15 and a heat transfer pipe 17. The oil passage 1 is provided at its upper end with an outlet 1a connected to an oil passage 2 which is formed at the upper end of the casing. The passage 2 has an oil discharging port 2a. The casing assembly 10 houses an electric motor 20 having a flat and hollow rotor 23 and an epicyclic reduction gear 30 accommodated in the hollow rotor 23.

The electric motor 20 has a stator 21 around which a coil 22 is wound. The rotor 23 of the electric motor 20 includes a hollow iron core around which permanent magnets 24 are clamped by a band clamp 25. The rotor 23 is also provided at one end with a thin walled portion 26 extending axially outward (toward the wheel side) from the permanent magnets 24, and is rotatably supported at this thin walled portion 26 and at its opposite end. In the illustrated embodiment, the opposite end is supported by a ball bearing 41 fitted in the housing 11 and the thin walled portion 26 end is supported by a ball bearing 42 fitted on a ring gear 31 of the epicyclic reduction gear 30. The ring gear 31 of the epicyclic reduction gear 30 is press-fitted into the housing 12 and is held thereto by bolts. A sun gear 33 of the epicyclic reduction gear 30 is supported by a ball bearing 43 fitted to the housing 11, and is splined into the hollow rotor 23. A resolver 36 is arranged to detect rotation of resolver shaft 37 fixed into the sun gear. The sun gear has a hollow which connects to the oil passage 2 through the lubricating oil passage 3 to receive the lubricating oil directly from the oil passage 3. The junction between the passage 3 and the hollow in the sun gear is sealed by a seal ring 38. A pinion shaft 34 is connected to an output carrier 51 forming an output rotation shaft, and rotatably carries a pinion gear 32 through a needle bearing 45 so as to permanently mesh it with the ring gear 31 and the sun gear 33.

An output flange 52 is splined onto the output carrier 51 and is axially immovably fixed by a nut 53. The flange 52 is supported by the ring gear 31 through the double row angular bearing 44 located axially outside the pinion gear 32. An oil passage 4 is provided for supplying the lubricating oil to the double row angular bearing 44, and an oil seal 39 is fitted adjacent passage 4. A brake disk 56 is splined to the output flange 52, and a wheel 54 carrying a tire 55 is mounted on flange 52 by bolts and nuts. Since the epicyclic reduction gear 30 is disposed in the hollow of the rotor 23, the axial length can be reduced to form a flat and compact structure, which enables high speed rotation and an improved acceleration and deceleration. Further, the fact that the rotor is flat and has a large diameter causes no problem because the invention includes a rotor which is provided at one end with a thin walled portion and is axially and radially supported at the two opposite ends thereof near the outer periphery of the rotor. Further, concentricity is assured and thus the inclination of the rotor and the variation of the gap between the rotor and the stator can be minimized.

The oil pumping operation is described below.

The oil is supplied by the oil pump motor 16 from the oil sump 18 to the oil passage 1. The oil is cooled by the cooling fins 15 and the heat transfer pipe 17 associated to the oil passage 1, and is introduced through the outlet 1a provided at the upper end of the oil passage 1 into the oil passage 2 provided in the upper portion of the casing 10. The oil is ejected from the discharge port 2a of the oil passage 2 onto the coil 22 for cooling it, and returns along the oil guide to the oil sump 18 while contacting the coil end. The oil ejected from the discharge port 2a also flows through the passage 4 to cool the bearing for the ring gear 31.

The oil introduced into the passage 2 is supplied through the passage 3 to the hollow center of the sun gear 33. The oil supplied to the hollow center of the sun gear 33 is fed by centrifugal force through the oil passages 6a and 6b formed in the sun gear 33 to the pinion shaft 34 and the needle bearing 45 to lubricate them. Since the oil is ejected and reliably supplied, by the centrifugal force generated by rotation of the sun gear, to the frictional surfaces, i.e. the tooth surfaces of the reduction gear and the bearings, as described above, the durability thereof can be increased.

Figure 2:
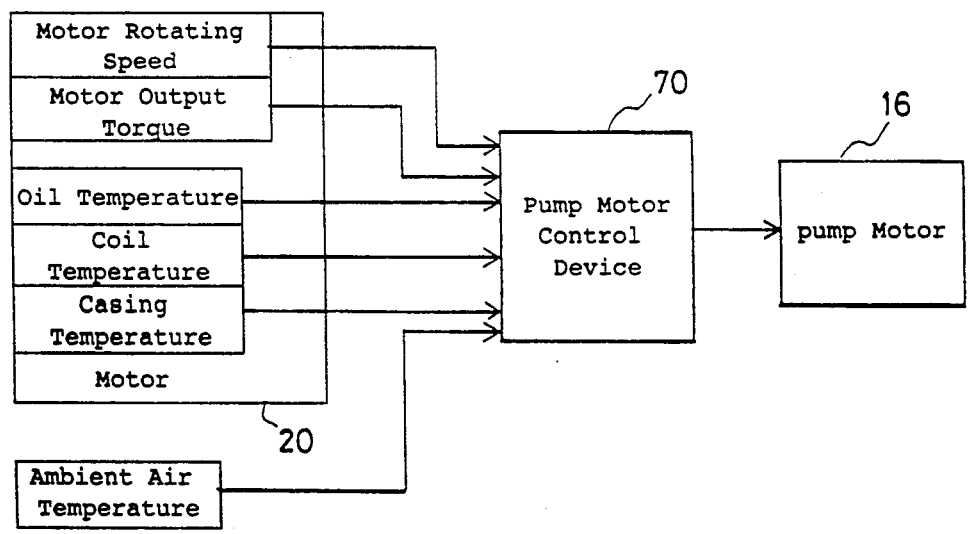
FIG. 2 is a block diagram illustrating a control system for an oil pump motor of the invention.
Figure 3:
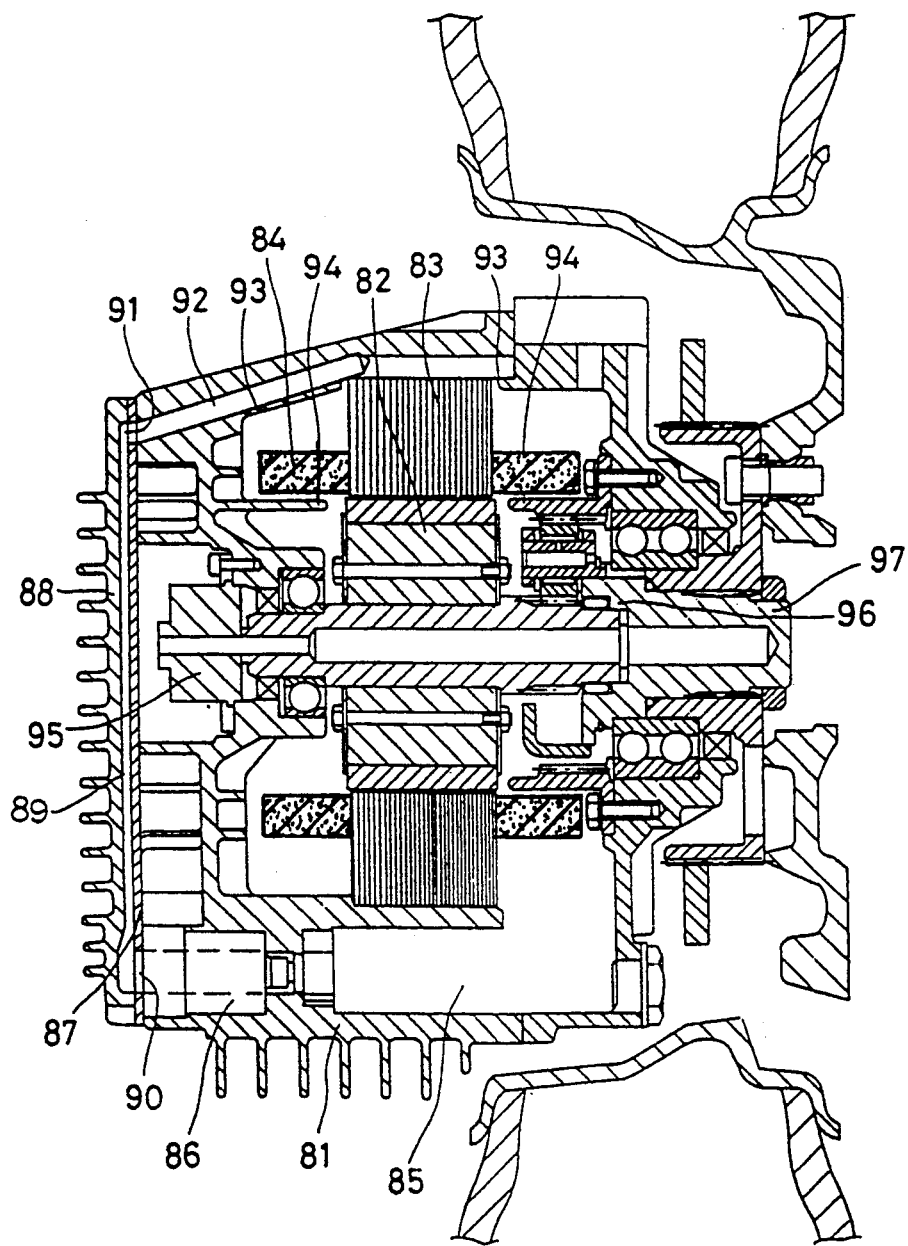
FIG. 3 is a cross-section of a lubricating device for a wheel motor in the prior art.

FIG. 2 is a block diagram illustrating a control system for the oil pump motor of the invention.

A control device 70 receives as control parameters, the rotational speed and the output torque of the motor as well as the temperatures of the oil, coil, motor and ambient air, which are detected by a rotating speed detector, a torque detector and temperature sensors (all not shown) attached to the motors, respectively (not shown). Based on these control parameters, the control device 70 acts, for example, to increase the motor rotational speed when the temperatures are low and thus the viscosity of the oil is high, and to reduce the motor rotational speed when the temperature rises and the viscosity of the oil lowers. Therefore, when the motor starts, i.e. when the temperature of the oil is low and the viscosity thereof is high, the rotational speed of the motor 16 is increased, so that the amount of the supplied oil is increased to prevent insufficient lubrication.

As described above, the invention utilizes a cooling device for a wheel motor in such a manner that the oil passage for the lubricating oil is formed to extend from the upper oil passage in the wheel motor casing downwardly into the hollow center of the shaft portion of the sun gear, so that the oil cooled in the side wall of the casing can be introduced through the lubricating oil passage into the rotating shaft and can be ejected by centrifugal force directly to the bearing portions and the tooth surfaces of the reduction gear. Therefore, reliable lubrication can be effected, and advantages such as increasing the durability of the reduction gears and other elements can be achieved in a compact structure.

Although a conventional oil pump is intended to discharge in a linear relationship to rotational speed, this linear discharge cannot be achieved because of viscosity changes due to changes in oil temperature, and thus, at an initial stage of driving, the oil pump cannot sufficiently supply the oil due to its higher viscosity, so that the wheel motor runs with less lubricating oil, which may cause problems such as seizure. However, the present invention can resolve these disadvantages.

Although particular preferred embodiments of the invention have been described in detail for illustrative purposes, it will be recognized that other variations or modifications may be made without departing from the spirit and scope of the invention as claimed.

We claim:

1. A lubricating system for a wheel motor provided with a casing having a side wall portion joining top and bottom portions for containing said wheel motor, a stator which includes a stator coil wound therearound and which is fixed in said casing, a hollow cylindrical rotor which is rotatably supported within said casing through a bearing and which is disposed inside said stator, an output flange which is rotatably supported within said casing through a bearing and which is fixed to a wheel, a reduction mechanism which includes an input gear supported by said rotor and an output gear supported by said output flange and which is disposed in said hollow in said rotor, an oil pump motor disposed in a lower portion of said casing, said lubricating system comprising:
   a first oil passage extending upward through said side wall portion of said casing;
   a second oil passage which is formed in said top portion of said casing and which is connected to said first oil passage for receiving oil therefrom, said second oil passage having a discharge port through which oil is ejected onto said stator coil for cooling said stator coil; and
   a third oil passage extending from said second oil passage to said reduction mechanism for supplying oil to said reduction mechanism.

2. The lubricating system of claim 1 further comprising cooling means, mounted on said side wall portion adjacent said first oil passage, for cooling oil as it passes through said first oil passage.

3. The lubricating system of claim 2 wherein said cooling means comprises cooling fins integral with said side wall portion.

4. The lubricating system of claim 3 wherein said cooling means further comprises a heat transfer pipe.

5. The lubricating system of claim 1 further comprising a fourth oil passage for receiving at least a portion of the oil ejected from said discharge port and feeding said portion of oil to a bearing supporting said reduction mechanism.

6. The lubricating system of claim 2 further comprising a fourth oil passage for receiving at least a portion of the oil ejected from said discharge port and feeding said portion of oil to a bearing supporting said reduction mechanism.

7. The lubricating system of claim 1 wherein said reduction mechanism includes:
   a sun gear having a hollow shaft portion, said hollow shaft portion having at least one port extending radially from the hollow of said shaft portion to the shaft exterior surface of said shaft portion, a ring gear and at least one pinion gear carried between said sun gear and said ring gear, and wherein said third oil passage is in fluid communication with the hollow interior of said shaft portion for supplying oil thereto, whereby rotation of said shaft portion produces a centrifugal force which propels oil from said hollow out through said one port for lubrication of said reduction mechanism.

8. The lubricating system of claim 2 wherein said reduction mechanism includes:
   a sun gear having a hollow shaft portion, said hollow shaft portion having at least one port extending radially from the hollow of said shaft portion to the shaft exterior surface of said shaft portion, a ring gear and at least one pinion gear carried between said sun gear and said ring gear, and wherein said third oil passage is in fluid communication with the hollow interior of said shaft portion for supplying oil thereto, whereby rotation of said shaft portion produces a centrifugal force which propels oil from said hollow out through said one port for lubrication of said reduction mechanism.

9. The lubricating system of claim 5 wherein said reduction mechanism includes:
   a sun gear having a hollow shaft portion, said hollow shaft portion having at least one port extending radially from the hollow of said shaft portion to the shaft exterior surface of said shaft portion, a ring gear and at least one pinion gear carried between said sun gear and said ring gear, and wherein said third oil passage is in fluid communication with the hollow interior of said shaft portion for supplying oil thereto, whereby rotation of said shaft portion produces a centrifugal force which propels oil from said hollow out through said one port for lubrication of said reduction mechanism.

10. The lubricating system of claim 6 wherein said reduction mechanism includes:
   a sun gear having a hollow shaft portion, said hollow shaft portion having at least one port extending radially from the hollow of said shaft portion to the shaft exterior surface of said shaft portion, a ring gear and at least one pinion gear carried between said sun gear and said ring gear, and wherein said third oil passage is in fluid communication with the hollow interior of said shaft portion for supplying oil thereto, whereby rotation of said shaft portion produces a centrifugal force which propels oil from said hollow out through said one port for lubrication of said reduction mechanism.

* * * * *